Nov. 8, 1966  J. HOFFMAN  3,283,587

ACCELERATION MEASURING GYROSCOPE

Filed Dec. 19, 1963

JAY HOFFMAN
INVENTOR.

BY S. A. Giarratana
Francis L. Masselle
ATTORNEYS

United States Patent Office 3,283,587
Patented Nov. 8, 1966

3,283,587
ACCELERATION MEASURING GYROSCOPE
Jay Hoffman, Livingston, N.J., assignor to General Precision Inc., Little Falls, N.J., a corporation of Delaware
Filed Dec. 19, 1963, Ser. No. 331,846
10 Claims. (Cl. 73—504)

The present invention relates to gyroscopes and more particularly to a case rotated gyroscope which can measure acceleration along its own spin axis in addition to providing case attitude intelligence.

It is well known that a case rotated free gyro is capable of good performance because any mass unbalance along the instrument's sensing axes periodically reverses its direction due to the case rotation so as to cause a cyclical gyro error rather than the more usual unidirectional error. The cyclical error averages out to zero in the presence of a constant acceleration, whereas the unidirectional error linearly increases with time.

In accordance with the present invention a case rotated free gyro is deliberately provided with a carefully calibrated mass unbalance along its sensing axes. The gyro-control signal is then separated into two components, a constant component providing case attitude intelligence, and a cyclical component which is directly related to acceleration along the spin axis of the gyro. The constant component can be used to provide stabilization command signals for angular position control, and the cyclical component resulting from the carefully calibrated mass unbalance can be used to provide acceleration intelligence for such applications as inertial guidance and thus eliminate the need for separate accelerometers.

Accordingly it is one object of the present invention to provide a gyroscope which can be used to measure acceleration.

It is another object of the invention to provide a gyroscope which can be used to provide both stabilization command signals for angular position control, and acceleration intelligence for such applications as inertial guidance.

It is a further object of the invention to provide a case rotated two degree of freedom gyro having a carefully calibrated mass unbalance along its sensing axes which produces a cyclical signal component directly related to acceleration along its own spin axis.

It is a still further object of the invention to provide a single degree of freedom gyro which can measure acceleration along its own spin axis.

Other objects and features of novelty of the present invention will be specifically pointed out or will otherwise become apparent when referring, for a better understanding of the invention, to the following description taken in conjunction with the accompanying drawings, wherein.

Figure 1:
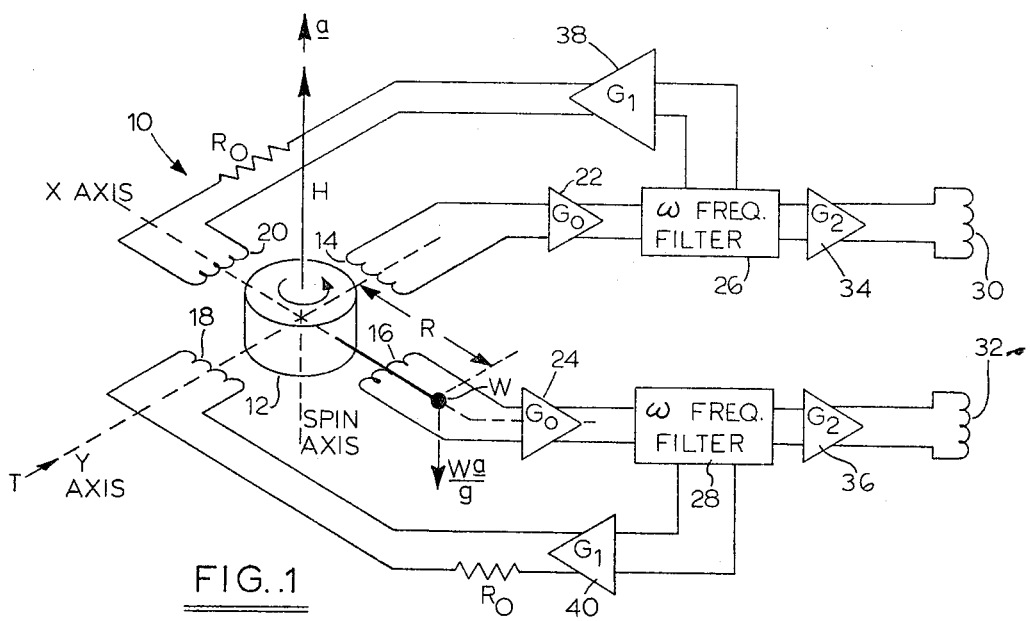
FIG. 1 is a schematic view of one embodiment of the present invention employing a two degree of freedom gyro.

Referring to FIG. 1, a two degree of freedom gyroscope 10 illustrating one embodiment of the present invention is shown schematically. Since the gyroscope 10 is a conventional case rotated two degree of freedom gyro with the exception of the calibrated mass unbalance which will be described hereinafter, only the gyro case 12 is illustrated along with the fixed pick-off and torquer coils 14–20 which define fixed X and Y axes. The case 12 is rotated about the spin axis of the fly wheel positioned therein at a relatively slow angular velocity, and the fly wheel is suitably supported within the case 12 for two degree of freedom movement about the X and Y axes. The pick-off coils 14 and 16 detect precession or relative angular movement of the fly wheel about the X and Y axes, respectively, and produce electrical output signals proportional to the angular movement. The torquer coils 18 and 20 torque the fly wheel 12 about the X and Y axes, respectively, to cause the fly wheel to precess about the Y and X axes, respectively.

In accordance with the present invention a predetermined weight W is fixed to the casing 12 for rotation therewith in the plane of the X and Y axes at a radius R from the spin axis of the gyro. As illustrated in FIG. 1 the weight W is shown on the X axis and the distance R is equal to the distance of the weight W from the Y axis. The gyro is operated in a captured mode by energizing the torquer coils 18 and 20 in response to the signals received from the pick-off coils 16 and 14, respectively. The output signals from the pick-off coils 14 and 16 are amplified by amplifiers 22 and 24, respectively, and applied to $\omega$ frequency filters 26 and 28, respectively. These filters filter out the oscillating components of the pick-off signals due to acceleration along the spin axis and apply the necessary signal to torquer coils 30 and 32 which control the angular position of the platform on which the gyro 10 is mounted. The torquer coil 30 torques the platform about the X axis and the torquer coil 32 torques it about the Y axis. The signals from the frequency filters 26 and 28 are amplified by amplifiers 34 and 36 before being applied to the torquer coils 30 and 32.

$\omega$ Frequency filters 26 and 28 also apply the oscillating signal component of the pick-off coils 14 and 16 to the torquer coils 20 and 18, respectively. Specifically, the oscillating signal component from the filter 26 is amplified by the amplifier 38 and applied to the torquer coil 20. The oscillating signal from the filter 28 is amplified by an amplifier 40 and applied to the torquer coil 18. With this arrangement the acceleration $a$ along the spin axis is proportional to the torquer current. Readout resistors $R_0$ may be provided in series with each of the torquer coils 18 and 20 to facilitate reading out the magnitude of the current to the torquer coils. The oscillating signal component produced by each of the pick-off coils 14 and 16 will be 90° out of phase with one another and their frequency will be determined by the speed at which the casing 12 is rotated.

It is not essential that the gyro be operated in the captured mode. Acceleration information may be obtained directly from a voltage reading at the input to the amplifiers 38 and 40, since this information is proportional to the oscillating signal components of the pick-offs which, in turn, are related to acceleration by the following expressions:

(1) $$\frac{T}{HW}=\theta$$

(2) $$\frac{R\dfrac{W}{g}a=\theta}{H\omega}$$

(3) $$K\theta=V_1$$

(4) $$\theta=\frac{V_1}{k}$$

(5) $$\therefore V_1=\frac{kR\dfrac{W}{g}a}{H\omega}$$

Where: $\omega$=case rotation frequency; $a$=acceleration vector along spin axis; $R$=radius to unbalanced weight; $H$=angular momentum of fly wheel; $W$=unbalanced weight; $g$=acceleration due to gravity; $\theta$=angle of oscillation of the fly wheel; $k$ = pick-off gradient multiplied by $G_0$ (the gain of the amplifiers 22 and 24); $T$ = torque vector inducing the oscillations.

However, in an open loop operation there is an error in the acceleration readout associated with variations in angular momentum H and case rotation speed. Also in the captured mode of operation, the direct pick-off output may be used for stabilization due to the higher signal to noise ratio. This among other things improves the stabilization loop response.

Figure 2:
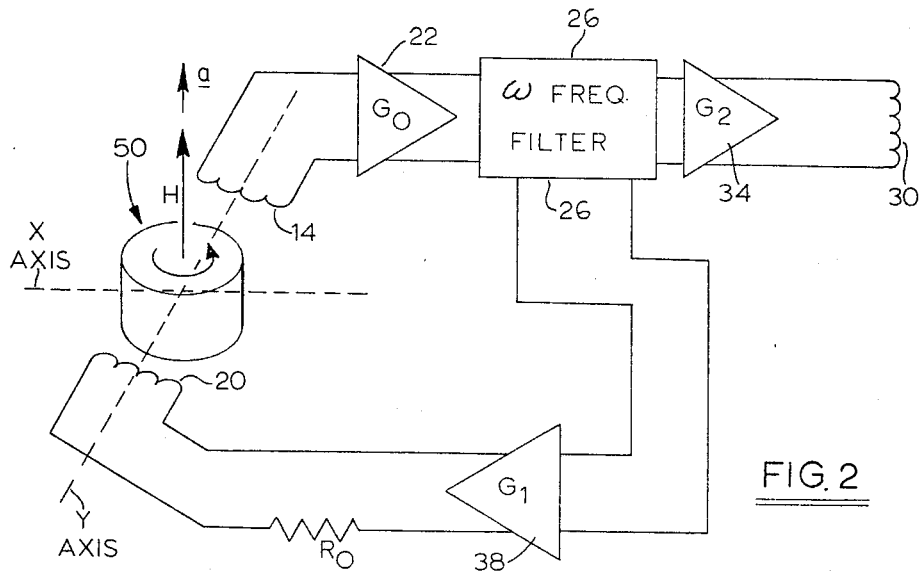
FIG. 2 is a schematic view of another embodiment of the present invention employing a one degree of freedom gyro.

Referring to FIG. 2 the present invention is illustrated in connection with a one degree of freedom gyro 50. In this embodiment the pick-off coil 41 detects precession about the X axis as before and its output signal is amplified by the amplifier 22 before being applied to the $\omega$ frequency filter 26. The steady state signal from the $\omega$ frequency filter is amplified by the amplifier 34 and then applied to the torquer coil 30 associated with the X axis gimbal of the platform. The oscillating component of the signal from the filter 26 is amplified by the amplifier 38 and applied to the torquer coil 20 which, since this is a one degree of freedom gyro, is located on the same axis as the pick-off coil 14. A readout resistor $R_0$ is provided as before to facilitate reading out the magnitude of the torquer current.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, the invention can also be applied to a free gyro of the type in which the X and Y axes pick-off and torquer coils 14–20 rotate with the case 12. However, since this requires the use of a resolver, it is not as desirable.

What is claimed is:

1. An acceleration measuring gyro comprising a case rotated gyro having its case rotated about the spin axis of the fly wheel positioned within the case, a predetermined mass unbalance rotatable with the case and displaced a predetermined distance radially from said spin axis, pick-off means for detecting precession of said fly wheel, and frequency filter means connected to said pick-off means for filtering out a cyclical signal having the same frequency as the frequency of rotation of said case and directly related to acceleration along said spin axis.

2. An acceleration measuring gyro comprising a case rotated gyro having its case rotated about the spin axis of the fly wheel positioned within the case, said case having a predetermined mass unbalance rotatable therewith and displaced a predetermined distance radially from said spin axis, pick-off means for detecting relative angular movement of said fly wheel, and frequency filter means connected to said pick-off means for filtering the output signal from the pick-off means into a cyclical component related to acceleration along said spin axis and a non-cyclical component providing case attitude intelligence.

3. The invention as defined in claim 2 wherein said gyro is mounted on a platform, and including means for controlling the angular position of said platform in response to said non-cyclical component.

4. A gyro for measuring acceleration along its own spin axis comprising a two degree of freedom case rotated gyro having its case rotated about the spin axis of the fly wheel positioned within the case, a predetermined mass unbalance rotatable with said case and displaced a predetermined distance radially from said spin axis, pick-off means for detecting relative angular movement of said fly wheel about both of its sensing axes, frequency filter means connected to said pick-off means for filtering out two non-cyclical signal components each directly related to said relative angular movement of said fly wheel about different ones of said sensing axes, said frequency filter means also filtering out two cyclical signal components 90° out of phase with one another and each directly related to cyclical oscillations induced in said fly wheel by said acceleration, and torquer coil means controlled by said two cyclical signal components for capturing said fly wheel against the cyclical oscillations induced by said acceleration.

5. A gyro for measuring acceleration along its own spin axis comprising a two degree of freedom case rotated gyro having its case rotated about the spin axis of the fly wheel positioned within the case, a predetermined mass unbalance rotatable with the case and displaced a predetermined distance radially from said spin axis, X axis electrical pick-off means for detecting relative angular movement of said fly wheel about a fixed X axis perpendicular to said spin axis, Y axis electrical pick-off means for detecting relative angular movement of the fly wheel about a fixed Y axis perpendicular to said spin axis and X axis, first frequency filter means connected to said X axis pick-off means for filtering out a cyclical output signal having the same frequency as the frequency at which said case is rotated, torquer coil means controlled by said first cyclical output signal for capturing said fly wheel against cyclical oscillations about said X axis induced by acceleration along said spin axis, second frequency filter means connected to said Y axis pick-off means for filtering out a second cyclical output signal having the same frequency as the frequency at which said case is rotated, and second torquer coil means for capturing said fly wheel against the cyclical oscillations about said Y axis induced by acceleration along said spin axis.

6. The invention as defined in claim 5 wherein said first and second frequency filter means also filters out first and second non-cyclical output signals which provide case attitude intelligence.

7. The invention as defined in claim 5 wherein said X and Y axis pick-off means include fixed X and Y axis pick-off coils connected to said first and second frequency filter means, respectively, and wherein said first and second torquer means include fixed X and Y axis torquer coils controlled by said X and Y axis pick-off coil for capturing said fly wheel against oscillations about said X and Y axes.

8. A gyro for measuring acceleration along its own spin axis comprising a case rotated gyro having two degrees of freedom about X and Y axes perpendicular to the spin axis of the fly wheel positioned within the case, said case being rotated about said spin axis, a predetermined mass unbalance rotatable with the case in the plane defined by said X and Y axes and displaced a predetermined distance radially from said spin axis, said gyro including a fixed pick-off coil and a fixed torquer coil positioned on said X axis on opposite sides of said fly wheel, a fixed pick-off coil and a fixed torquer coil positioned on said Y axis on opposite sides of said fly wheel, a first amplifier connected to said X axis pick-off coil, a second amplifier connected to said Y axis pick-off coil, a first frequency filter means connected to said first amplifier for filtering out a cyclical output signal having the same frequency as the frequency at which said case is rotated, a second frequency filter means connected to said second amplifier for filtering out a cyclical output signal having the same frequency as the frequency at which said case is rotated, a third amplifier for amplifying the cyclical output of said first frequency filter means, and a fourth amplifier for amplifying the cyclical output of said second frequency filter means, said Y axis torquer coil being connected to said third amplifier, said X axis torquer coil being connected to said fourth amplifier whereby acceleration acting on said gyro along said spin axis is proportional to the current to the torquer coils.

9. A gyro for measuring acceleration along its own spin axis comprising a one degree of freedom case rotated gyro having its case rotated about the spin axis of the fly wheel positioned within the case, a predetermined mass unbalance rotatable with said case and displaced a predetermined distance radially from said spin axis, pick-off means for detecting precession of the fly wheel about a stationary X axis perpendicular to said spin axis, and frequency filter means connected to said pick-off means for filtering out a cyclical output signal having the same frequency as the frequency at which said case is rotated and which is directly related to acceleration acting on said gyro along said spin axis.

10. The invention as defined in claim 9 including torquer means controlled by said cyclical output signal for capturing said fly wheel against precession about said X axis.

References Cited by the Examiner

UNITED STATES PATENTS

| | | | |
|---|---|---|---|
| 2,925,736 | 2/1960 | Mueller | 74—5.6 |
| 3,041,883 | 7/1962 | Aske et al. | 73—504 |

RICHARD C. QUEISSER, *Primary Examiner.*

JAMES J. GILL, *Examiner.*